R. W. CHADWICK.
UTENSIL.
APPLICATION FILED NOV. 21, 1911.

1,063,911. Patented June 3, 1913.

Inventor
Robert W. Chadwick

By Victor J. Evans
Attorney

Witnesses

UNITED STATES PATENT OFFICE.

ROBERT WILLIAM CHADWICK, OF DAVISVILLE, ONTARIO, CANADA.

UTENSIL.

1,063,911.

Specification of Letters Patent.

Patented June 3, 1913.

Application filed November 21, 1911. Serial No. 661,619.

*To all whom it may concern:*

Be it known that I, ROBERT W. CHADWICK, a subject of the King of Great Britain, residing at Davisville, in the Province of Ontario, Dominion of Canada, have invented new and useful Improvements in Utensils, of which the following is a specification.

This invention relates to utensils such as teakettles, washboilers, or the like, the object of the invention being to provide a utensil wherein the bottom will be formed with a very broad heating surface so as to effect a very rapid heating of the water.

Figure 1:
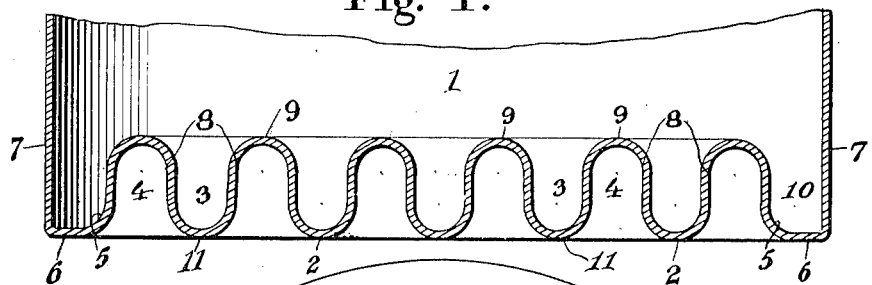
Figure 2:
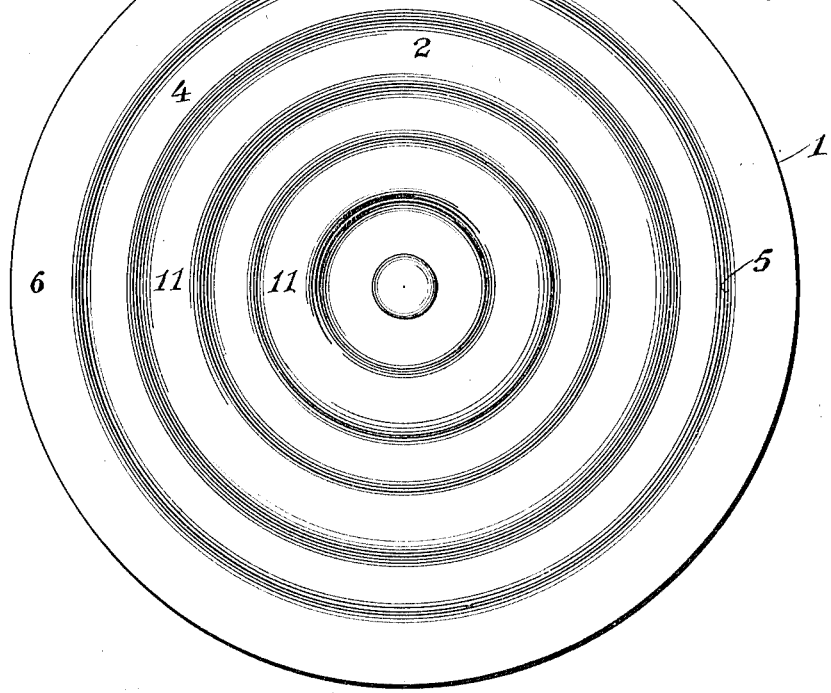
Figure 3:
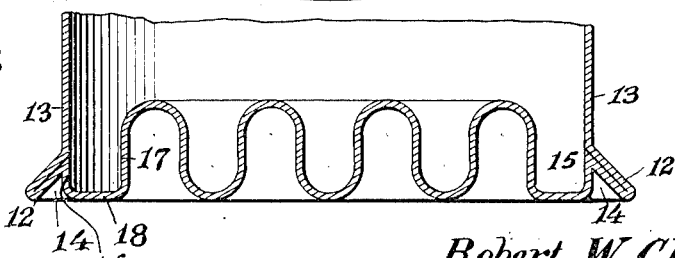

In the drawing, forming a portion of this specification and in which like numerals of reference indicate similar parts in the several views:—Figure 1 is a vertical section through the utensil. Fig. 2 is a bottom plan view thereof. Fig. 3 is a view similar to Fig. 1 showing a slightly modified form of the invention.

I am aware that it is old in the art to provide utensils with corrugated bottoms or walls for the purpose of reinforcing the same. In such devices no particular attempt to provide the corrugated bottom with means for permanently supporting the same and preventing the vessel from being turned over.

In the utensil shown in Fig. 1 of the drawing the receptacle 1 is provided with a circular bottom which is corrugated to provide concentric convex portions 2 and inner concentric concavities or wells 3 and outer deep concavities or heat-confining or retaining spaces 4. The outermost corrugated portion of the bottom is curved, at 5, into the flat horizontally disposed combined heating and utensil-supporting surface 6, and as illustrated, the surface 6 is extended directly into the vertical walls 7 of the utensil. The wells 3 formed by the corrugation in the bottom of the utensil are substantially of U-configuration in vertical section, as shown in Fig. 1 of the drawing. The concavities 4 are identically constructed and each is provided with a plurality of side heating surfaces 8 and a top curved connecting surface 9. The water in the utensil is free to circulate in the well portions 3 and in the relatively large outer circulating space 10. The space 10 is defined by the outer wall of the outermost corrugated portion of the bottom, the vertical side walls 7 and the surfaces 5 and 6 so that the water in the space 10 and the well portions 3 will be equally subjected to the full action of the heat, the relatively broad flat surface 6 and the outer wall of the outermost corrugated portion of the bottom serving as the heating surfaces for the water in the space 10. By providing the relatively broad annular space 10 at the outermost portion of the bottom the water will be held, and scorching of the utensil at the bottom will be positively prevented. The lower curved portions 11 which connect the parallel vertical walls 8 with each other form surfaces on which the utensil can be supported. When the utensil is supported on a stove which is provided with a flat top the annular concavities 4 will be closed through contacting of the portions 11 with the stove. In view of the above, it is seen that the heat will be confined in the concavities for effective application to the walls defining the wells 3. As described, the flat horizontal surface 6 so increases the heating surface of the bottom that the water in the space 10 will be thoroughly heated but it may be understood that the surface 6 forms an effective support to positively hold the utensil against upsetting while in use.

In the form of the invention shown in Fig. 3, the bottom is substantially the same as that described in the preferred form, the difference being in the provision of an outwardly flared flange 12. This flange is spaced from the side walls 13 of the utensil so as to form an intervening heating space 14. From this construction the water in the outermost space 15 in the bottom will be subjected to the heat which will be applied to the vertical surfaces 16 and 17 and the horizontal surface 18. The flange 12 also acts in addition to the flat bottom surface 18 to positively prevent the upsetting of the utensil while in use.

I claim:

A utensil having a corrugated bottom, the walls of the corrugated portions defining concentric relatively deep concavities beneath the utensil and relatively deep concentric wall portions within the utensil, a flat supporting surface formed on the outermost portion of the bottom and a downwardly and outwardly flared thickened portion formed integral with the side walls of the receptacle, said flared portion being disposed outwardly of the outermost corrugated portion of the bottom and concentric therewith, substantially as and for the purpose specified.

In testimony whereof I affix my signature in presence of two witnesses.

ROBERT WILLIAM CHADWICK.

Witnesses:
D. S. TOVELL,
H. M. CHRISTMAN.